(12) United States Patent
Dervault et al.

(10) Patent No.: US 8,657,232 B2
(45) Date of Patent: Feb. 25, 2014

(54) FUSELAGE STRUCTURE FOR COMBINED FIXING OF INSULATION BLANKETS AND ITEMS OF EQUIPMENT, AIRCRAFT INCORPORATING SUCH A STRUCTURE

(75) Inventors: Franck Dervault, Plaisance du Touch (FR); Nicolas Dantou, Colomiers (FR); Gilles Mercadier, Saint Sulpice (FR)

(73) Assignee: Airbus Operations S.A.S., Toulouse (FR)

( * ) Notice: Subject to any disclaimer, the term of this patent is extended or adjusted under 35 U.S.C. 154(b) by 275 days.

(21) Appl. No.: 13/120,164

(22) PCT Filed: Sep. 22, 2009

(86) PCT No.: PCT/FR2009/001118
§ 371 (c)(1),
(2), (4) Date: Jun. 6, 2011

(87) PCT Pub. No.: WO2010/034903
PCT Pub. Date: Apr. 1, 2010

(65) Prior Publication Data
US 2011/0233336 A1   Sep. 29, 2011

(30) Foreign Application Priority Data
Sep. 23, 2008  (FR) ..................... 08 56397

(51) Int. Cl.
*B64C 1/00* (2006.01)
*B64C 1/10* (2006.01)
*B64D 7/00* (2006.01)

(52) U.S. Cl.
USPC .......................................... 244/119; 244/121

(58) Field of Classification Search
USPC ............. 244/119, 132, 121; 248/65, 68.1, 69, 248/72, 201
See application file for complete search history.

(56) References Cited

U.S. PATENT DOCUMENTS

| | | | | |
|---|---|---|---|---|
| 4,715,560 A | * | 12/1987 | Loyek ........................ | 244/117 R |
| 4,828,202 A | * | 5/1989 | Jacobs et al. .............. | 244/117 R |
| 5,893,534 A | * | 4/1999 | Watanabe ..................... | 244/119 |
| 6,883,753 B1 | * | 4/2005 | Scown ....................... | 244/118.1 |
| 7,823,362 B2 | * | 11/2010 | Meyer ........................... | 52/713 |
| 8,302,909 B2 | * | 11/2012 | Cazeneuve et al. ........... | 244/120 |
| 2005/0082431 A1 | | 4/2005 | Scown et al. | |
| 2008/0067289 A1 | * | 3/2008 | Meyer .......................... | 244/131 |
| 2010/0282905 A1 | * | 11/2010 | Cazeneuve et al. ........... | 244/120 |

FOREIGN PATENT DOCUMENTS

WO    2005 068290    7/2005

OTHER PUBLICATIONS

International Search Report issued Jan. 5, 2010 in PCT/FR09/001118 filed Sep. 22, 2009.

* cited by examiner

*Primary Examiner* — Philip J Bonzell
(74) *Attorney, Agent, or Firm* — Oblon, Spivak, McClelland, Maier & Neustadt, L.L.P.

(57) ABSTRACT

An installation of systems in aircraft fuselages such as thermophonic insulation mattresses and devices such as onboard systems, and bundles of electric wires or fluid ducts (air, water, oxygen, hydraulic fluid). A structure for fastening onto an aircraft fuselage includes at least frames and stringers, the structure further including: fuselage stabilizers connecting the frames and stringers, wherein two stabilizers of two consecutive frames face each other between the two consecutive frames; and a strip board connecting the two stabilizers and including a fastening mechanism arranged so as to receive corresponding fastening mechanisms of the insulation mattresses and the devices.

12 Claims, 10 Drawing Sheets

A-A  B-B

FUSELAGE STRUCTURE FOR COMBINED FIXING OF INSULATION BLANKETS AND ITEMS OF EQUIPMENT, AIRCRAFT INCORPORATING SUCH A STRUCTURE

This invention relates to the installation of systems in the fuselages of aircraft, in particular for civil transport, and more especially to a structure for combined fastening of thermophonic insulation mattresses and equipment items such as on-board systems, bundles of electric wires or fluid ducts (air, water, oxygen, hydraulic fluid).

It is known to use anchoring points on the actual structure of the fuselage, as shown on FIG. 1. These anchoring points generally consist of borings implemented in the primary structural elements such as the frames or the stringers. Plastic pins or improved fastener devices such as those described in the application FR 2 904 804 then are used to fasten the equipment items and mattresses with the aid on top of the frames and stringers.

These anchoring points, however, have many drawbacks for the structure of the aircraft.

On the one hand, the borings on the frames and the stringers weaken the structure and are sources of fatigue risk for these structural elements. Thus at the present time one is led to limit the number of anchoring points to only what is necessary to fasten the equipment items and mattress.

This structural weakening is even more significant in contemporary aircraft structures, because the latter, predominantly of composite type, have poorer resistance properties for everything relating to perforations (occupied or blind unfilled holes, bearing resistance, etc.).

It is also noted that the current trend for the installation of insulation mattresses and equipment items in the fuselage is to so-called "mechanical" installation, by which fastenings are installed with clearances on the primary structure. This type of installation makes it possible to increase the speed of installation and design of installation diagrams. These clearances, however, increase the stresses on these weakened parts of the structure even more.

Although providing local reinforcements around these borings already has been considered, there is no economically and technically viable solution for creating such reinforcements on the frames or stringers when little margin (material width) is available around borings. In particular, for composite structures, rules for take-up of folds impose very extensive reinforcement zones, sometimes incompatible with the dimensions of the parts.

On the other hand, in order to avoid these problems of local reinforcements, certain fixed supports with very little load sometimes are provided, by bonding, at various places on the fuselage, so as to accommodate the mattresses or equipment items. These fixed supports, however, must be installed at places giving them little load, but also comply with the development diagrams for systems in the aircraft. They therefore require long and costly preliminary studies.

Also, moreover, the omega stringers, the ones ordinarily used, are particularly delicate to drill, at the cores or the inner base-plate, because of delaminating risks on the inner face which prove to be impossible to inspect and detect, as well as risks of impairing the outer skin of the aircraft. Thus it is laborious to provide anchoring points on such a part of the fuselage structure.

The invention is intended to overcome at least one of the aforementioned drawbacks by proposing to group the anchoring points, in modular manner, on non-critical structural parts, with little load and easily accessible.

To this end, the invention applies in particular to a structure for combined fastening of insulation mattresses and equipment items on the fuselage of an aircraft made up at least of frames and stringers, the said structure comprising fuselage stabilizers connecting the frames to the stringers, in which structure:
- two stabilizers of two successive frames face one another between the two successive frames, and
- the said structure comprises a strip board connecting the said two stabilizers and comprising fastening means arranged so as to accommodate corresponding fastening means of the said insulation mattresses and equipment items.

According to the invention, fastening means for the mattresses and equipment items thus are provided without affecting the stringers and frames, and only a very limited number of fastenings is to be provided on the stabilizers in order to hold the strip board. By "strip board" there is understood any type of slender mechanical part making it possible to connect the two stabilizers and supporting the fastening means. In this way the invention eliminates any weakening of the frames and stringers and greatly reduces that of the stabilizers.

Furthermore, all the fastening means are brought together on a structural part which, in the end, has little stress load, since it is complementary to the standard structure. In this way the fixed supports with little load and their preliminary developments are eliminated. Moreover, because the strip board has little load, the weakening brought about by the fastening means provided thereon does not constitute a handicap.

In one embodiment, the said fastening means of the strip board comprise a plurality of preformed borings arranged so as to accommodate the said corresponding fastening means and disposed in the part of the strip board between the two stabilizers. Such a strip board thus is seen as a "modular" fastener system since the borings are available and used according to needs. In this way, a new configuration (new water routing, for example) may be deployed rapidly in an existing airplane, because it requires neither new borings nor isolation of the zone to be drilled in order to confine the dust produced, for example that from CFRP ("Carbon Fiber Reinforced Plastic" according to English terminology) material which could cause electric shocks on other equipment items such as electronic cards.

In order to minimize the impact of fastening of the strip board on the mechanical potential of the stabilizers to which it is fastened, it is provided to adapt the design of the core of the stabilizers so that they support the fastening function as well as the mechanical one.

According to one configuration of the invention, at least one part of the said strip board constitutes a part of one of the two stabilizers. In this implementation, the strip board is integrated (in a single piece) into one of the stabilizers which enables the latter not to be weakened, as a result of fastenings to the strip board, at the part bearing the mechanical stresses between stringer and frame. The end of the stabilizer extending in a strip board is itself provided with fastening means to come to be fastened with the opposite stabilizer.

In particular, the two stabilizers each comprise a portion extending in the form of a strip board part and are fastened to one another by the respective free ends of the two strip board parts. In this configuration, it may be chosen in particular that each stabilizer integrates, for example, half of the strip board. In this way, it is possible to use one and the same type of stabilizer, which simplifies the production of same and their supplying to the assembly lines.

In one embodiment of the invention, a plurality of strip boards connecting a respective plurality of pairs of stabilizers facing one another and disposed staggered in the fuselage.

By virtue of this architecture with regular geometry, the thermophonic insulation mattresses, used to cover the fuselage in its inner part, may be standard. In fact, whereas in the solutions of the prior art, the disparate positions of the fastening means required a case-by-case cutting to shape of the insulation mattresses depending on the fuselage zone or new attachment points to be created, the bringing together of these fastening means on strip boards and the layout of the latter in regular manner makes it possible to define regular zones (formed by the frames and the strip boards) for integration of the mattresses. In this way the number of mattress designs to be used, and therefore the costs of production, installation and servicing/maintenance, are reduced.

Moreover, the staggered fastening makes it possible to form an interlinked assembly of the mattresses since the latter are connected to each other, also staggered.

According to one configuration of the invention, the said strip board comprises a flat core and an upper edge perpendicular to the main core so as to form a support surface for the equipment items to be fastened. In particular the said strip board has a general inverted "L" shape formed by the vertical core and the upper edge. In this way, the fastening and stability of the equipment items on the strip board are improved.

According to a specific characteristic, the said fastening means of the strip board comprise a plurality of borings provided in the said core and at least one fastening element, the said fastening element having a lower part provided with a pin able to engage into one of the borings, an intermediate part locally in the shape of an inverted "U" and of a size more or less equal to the said upper edge so as to come to bear on top, and an upper part comprising a means for holding or support of the said equipment items. By way of example, this upper part may contain one or more from among a clip for a wire, a support edge, grommets for accommodating fastening clamps. The inverted "U" shape makes it possible in particular to come to "clip" the support edge so as to ensure an effective fastening of the fastening element. By virtue of such removable fastening elements, also called pins, it is easy to deploy systems in the fuselage by making use of predrilled strip boards, like an installation in "kit" form. Attachment of these elements on the strip board is accomplished by simple "clipping."

According to another specific characteristic, the said strip board comprises "L"-shaped lugs extending underneath the said core and alternately positioned on both sides of the said core, each lug comprising, in the extension of the "L", at least one fastening means able to accommodate an insulation mattress. These lugs have a dual function: on the one hand fastening of the mattresses, for example via borings and corresponding fastenings, and on the other hand support of same by virtue of the surface of the edge of the "L", in that way reducing the mechanical stresses to which the fastening pins are directly subjected.

In one embodiment, the said strip board, the stabilizers and the frame comprise a metallized face and a nonmetallized face, the said strip board and a stabilizer being fastened by their metallized faces, each stabilizer and the corresponding frame being fastened at their nonmetallized faces by traversing fastening means ensuring an electric conduction between their opposite metallized faces. In this way, a conductive meshing is achieved over the fuselage as a whole, ensuring an effective electromagnetic protection.

The invention also applies to an aircraft comprising a fastening structure such as presented above.

The aircraft optionally may comprise means relating to the structural characteristics presented above.

In addition to the advantages set forth above, the invention also allows a reduction of the cost and the cycle of modifications, a reduction of the final assembly line cycle (cycle for installation of fastening harnesses in the cabin, for example), a reduction of the cycle for cabin conversion in use by simplifying the layout or modification of electric harnesses without new installation of fixed supports, a standardization of procedures in the two preceding cases, and also the absence of drilling necessary for installing new wiring or ducts.

The advantage provided by the invention is all the greater when the aircraft structure is composite.

Other features and advantages of the invention also will become apparent in the description below, illustrated by the attached drawings, in which.

Figure 1:
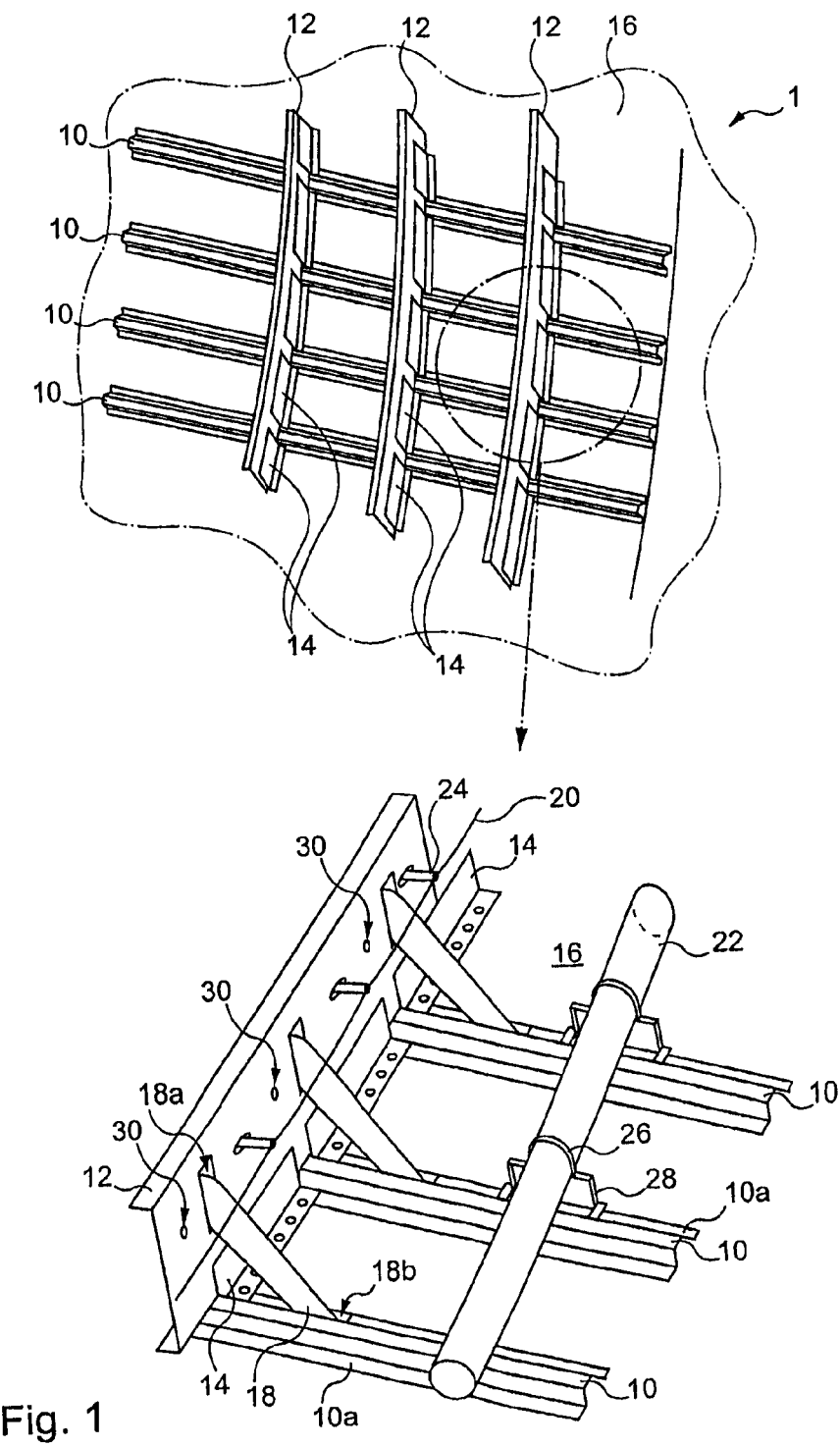
FIG. 1 shows a fuselage structure and the fastening of equipment items and insulation mattresses thereon in accordance with the prior art.
Figure 3:
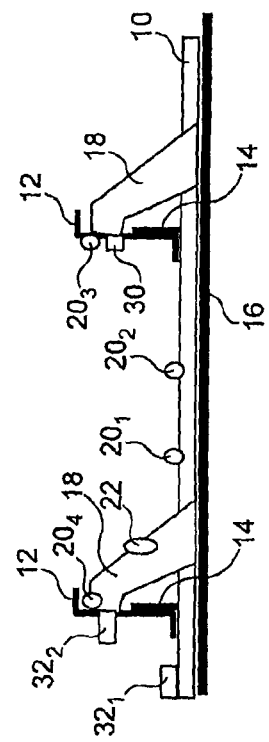
FIG. 3 is a view in cross section of a fuselage structure of the prior art equipped with attachment points.
Figure 2:
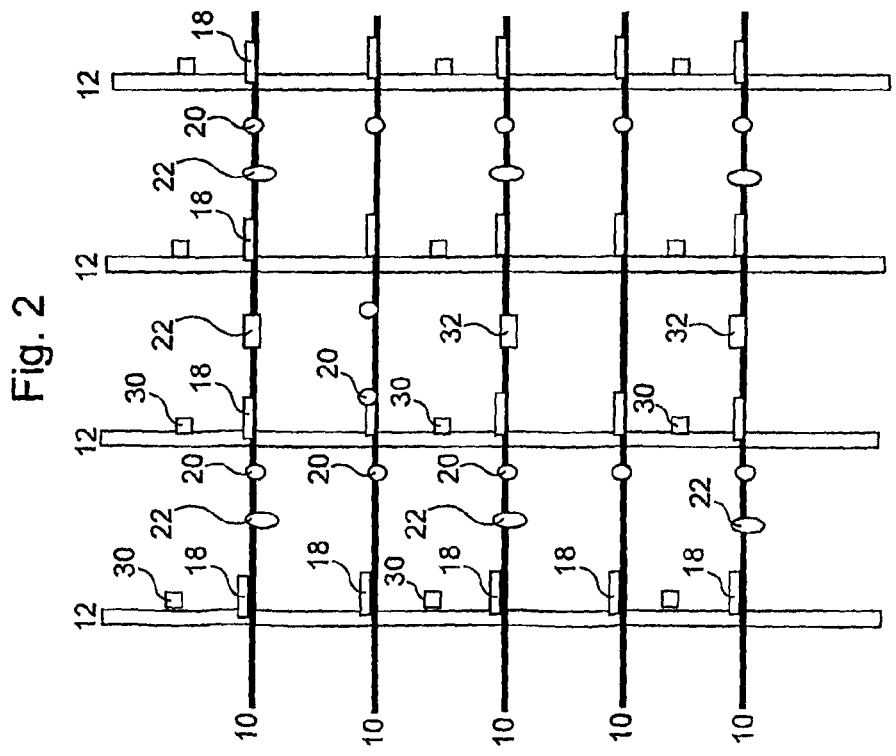
FIG. 2 shows the distribution of attachment points for the equipment items and mattresses of the prior art.

Fuselage structure 1 of the prior art shown on FIGS. 1 to 3 comprises longitudinal omega stringers 10 and frames 12 resting perpendicular on stringers 10, along constant intervals. "L"-shaped clips 14 for holding the frames are disposed at frame 12 between two consecutive stringers 10, and are fastened respectively to the frames and to base-plates 10a of the stringers. Skin 16 of the fuselage is joined onto base-plate 10a of stringers 10 and onto clips 14 by riveting.

As illustrated on the detail of FIG. 1, stabilizers 18 are provided at each intersection between a frame 12 and a stringer 10. These stabilizers 18 comprise a core terminating at two ends with perpendicular edges 18a and 18b so as to fasten them, by riveting, respectively to corresponding frame 12 and stringer 10. In particular, the stabilizers are fastened at base-plate 10a of the stringers.

Stabilizers 18 have the function of holding frame 12 by preventing it from rocking forward or backward, which also is called tilting. Furthermore, a second function of stabilizers 18 is to transfer a part of the pressurization effects from stringers 10 supporting skin 16 to frames 12.

These various elements generally are made of composite or metal materials.

A composite structure may be made of a composite with an organic matrix and fibrous reinforcements in the form of continuous fibers. By way of example, this may be in the form of continuous carbon fibers in a matrix (or carbon fiber reinforced resin referred to as PRFC or according to English terminology "Carbon Fiber Reinforced Plastic" CFRP), this matrix being thermosetting of epoxide type or thermoplastic of PEEK (polyether etherketone), PEKK (polyether ketone ketone) or PPS (phenylene polysulfide) type, the level of fibers in aeronautical applications being higher than or equal to 50%. Subsequently when composite material is mentioned, reference is made to this type of material.

Still referring to FIG. 1, various equipment items also are visible, here an electric wire 20 and an air-supply pipe 22 deployed on the fuselage and held with the aid of fastening elements 24, 26 and 28 aligned parallel to the frames.

Electric wire 20 is held at adjacent frame 12 by means of a plurality of fixed stanchions 24, themselves fastened along the frame by riveting. As for supply pipe 22, it is held by a clamp or harness 26 fastened to two fixed supports 28. The latter are riveted to the base-plate of stringers 10.

During assembly of the airplane comprising such a structure, stanchions 24 and supports 28 are permanently installed at the time of assembly of frames 12, stringers 10, clips 14 and stabilizers 18. Once this structure 1 is assembled, the deployment of bundles of wires, pipes and other equipment items is implemented by coming to bear on these stanchions and supports, Frames 14 also have regular borings 30 intended to accommodate fastening means, for example rivets or plastic pins, for thermophonic insulation mattresses (not shown) coming to cover the entirety of structure 1. These mattresses have a specific design according to the various installed equipment items 20, 22. Here, pipe 22 requires a special shape of the mattress. Because the installation of systems and equipment items depends heavily on the customization carried out during the preliminary study phases, and therefore generates numerous versions, several mattress designs are necessary for the same standard section of fuselage 1.

FIG. 2 presents a general architecture of the prior art where there respectively are positioned fastenings for air lines 22, electric wires 20, water lines 32, and fastenings 30 for insulation mattresses, generally borings in which fastenings pins are made to cooperate. These diverse fastenings are provided either on a frame 12 or on a stringer 10. The fastenings aligned parallel to frames 12 are added more or less frequently and are used to fasten the same bundle or duct.

Stabilizers 18 are placed at each frame-stringer crossing and are all turned in the same direction, for example toward the front of the aircraft.

FIG. 3 illustrates another exemplary distribution of equipment items at a stringer 10. The fastenings are provided on stringers 10 (fastenings $32_1$, $20_1$, $20_2$), on frames 12 ($32_2$, $20_3$, 30) or on stabilizers 18 (fastenings $20_4$, 22), and vary markedly, here, from one frame and one stabilizer to the other.

During the standard design of airplanes, many requests for attachment points for equipment items thus are made and each request must be validated by calculations and, if need be, one may be led to reinforce the parts supporting these attachment points. Special fastening parts in particular are created for installing equipment items, and the frame is drilled at numerous places to accommodate these fastening parts.

Figure 4:
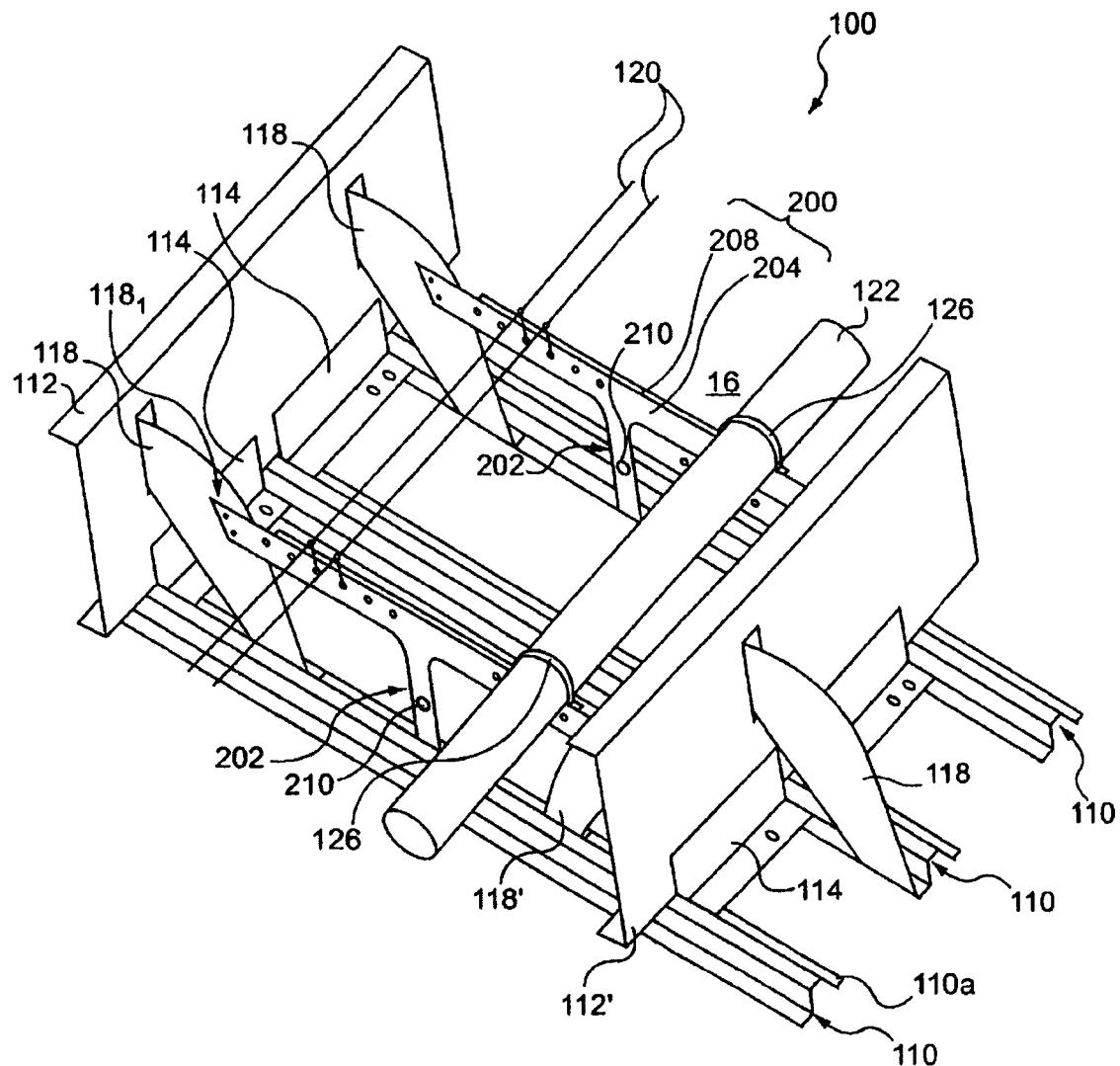
FIG. 4 shows a general view of a first example of the invention.

This invention now is illustrated with the aid of a first example shown on FIG. 4.

A primary fuselage structure 100, similar to that of FIG. 1, comprises longitudinal stringers 110, frames 112, 112', clips 114, a skin 116 and stabilizers 118, 118'.

The stabilizers are provided, along a frame 112, on one (118) and the other (118') side of the frame alternately at each new stringer 10. The stabilizers of adjacent frame 112' are offset in relation to frame 112 so that two stabilizers 118 and 118' are facing one another along the same stringer, in the same inter-frame space.

Stabilizers 118' therefore are "turned over" compared to the position of FIG. 1 and, with stabilizers 118 provided on the same frame 112 but on adjoining stringer 110, contribute to a better stability of frame 112 since stabilizers 118 and 118' are distributed on either side of the frame, and therefore prevent it from rocking both forward and backward.

A strip board 200 made of composite material, preferably of a thermoplastic more economical than CFRP, in the same way connects, parallel to a stringer 110, two stabilizers 118, 118' facing one another at this same stringer 110 Strip board 200 is fastened by two rivets to each of the stabilizers, and by at least one central lug 202 to base-plate 110a of stringer 110 for a better rigidity of the whole.

At the level of the fuselage as a whole, in this way there is achieved a staggered distribution of stabilizers 118, 118', as well as strip boards 200 placed between each pair of corresponding stabilizers (see below with reference to FIG. 8).

In comparison with the stabilizers of the prior art, those used in this configuration have, in the part extending toward the other corresponding stabilizer, an additional zone $118_1$ of material on which strip board 200 is fastened. This additional zone $118_1$ makes it possible to preserve the mechanical properties of the stabilizer without being impacted by the borings necessary for fastening of the strip board.

By virtue of the invention, the fastenings are thus brought together on this strip board 200 so as to no longer drill the frames and stringers for fastening of the equipment items and mattresses.

Figure 5:
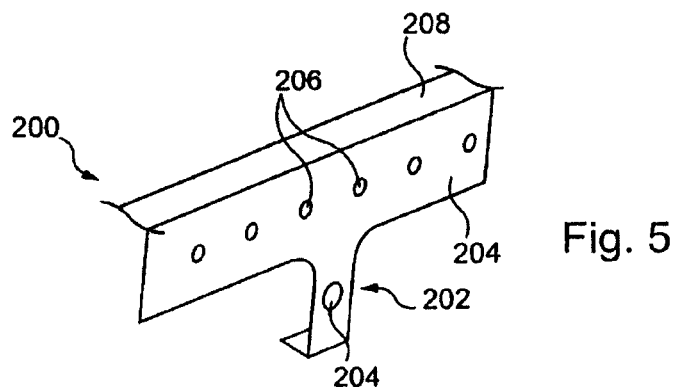
FIG. 5 shows the fastening strip board of FIG. 4.

As illustrated on FIG. 5, strip board 200 is a slender composite sectional part in the shape of an inverted "L", the larger part 204 of which is predrilled with a large number of holes 206 regularly distributed, for example borings 4 mm in diameter and spaced at an interval of 20 mm, and the small part 208 of the "L" constitutes an upper support edge.

Lower lug 202 enabling fastening to base-plate 110a also comprises a boring 210 intended to accommodate fastening means corresponding to the insulation mattresses.

This strip board 200 thus makes it possible to provide borings for the fastening of equipment items which are available, in modular form, according to needs. Moreover, by using the same strip board version, disposing borings 206 all aligned along the fuselage is ensured.

Figure 6:
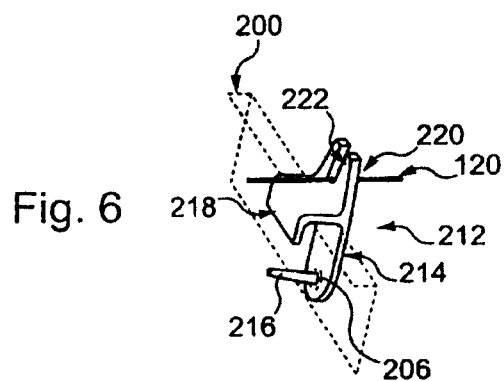
FIGS. 6 and 7 show systems for attachment of equipment items with the aid of the strip board of FIG. 5.
Figure 7:
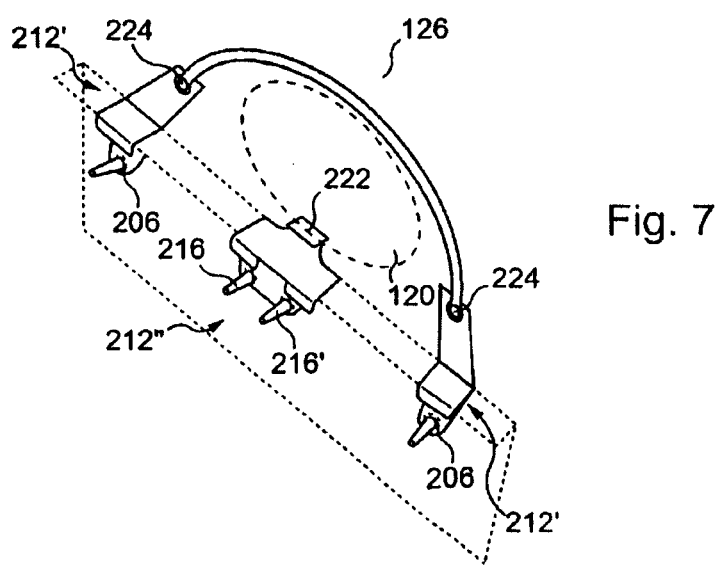

FIGS. 6 and 7 illustrate the fastening, respectively, of an electric wire 20 and an air pipe 22 such as shown, once positioned, on FIG. 4.

On FIG. 6, a sole plastic fastening element 212 is used to fasten electric wire 120 on strip board 200. As is understood from the foregoing, several of these elements 212, also called pins, are used on various strip boards 200 to fasten said wire 120 along the fuselage.

Element 212 comprises, in its lower part 214, a pin 216 that comes to engage, in fixed position, in one of the borings 206 of the strip board and, in its intermediate part 218, a sectional portion in the shape of an inverted "U" with the dimensions of edge 208 of the strip board and which comes to clip said edge 208. The combined presence of pin 216 and inverted "U"-shaped portion 218 ensure a holding of element 212 on strip board 200 by clipping.

The elastic nature of the plastic makes it possible to forcibly insert the element onto the strip board until the clip closes again when the inverted "U"-shaped part passes behind edge 208.

The use of such elements 212 allows a great flexibility of use, since same "clips" 212 may be used for all borings 206 throughout the airplane, and these may be removed, if need be, for example in the event of modification of the on-board systems.

Upper part 220 of pin 212 comprises a fastening means, here a clip 222 for electric wire 120 implemented in the form of a serrated notch in this upper part 220.

On FIG. 7, an assembly of three pins for fastening a duct 122 has been shown. Two side pins 212', similar to those of FIG. 6, are provided, in their upper part 220, no longer with a clip, but with a grommet 224.

As for a central pin 212", it is equipped in its upper part 220 with a support zone 222, possibly curved according to duct 122 to be fastened. Lower part 214 of this fastening element 212" comprises two pins 216 and 216' coming, in fixed position, to cooperate with two adjoining borings 206. In this way a better stability of this element 212" is ensured.

As a variant, it is possible, of course, to provide that fastening elements 212, 212' and 212" have two or even more pins 216 so as to proportionately increase their stress resistance.

As shown on FIG. 7 where the section of duct 122 is visible, fastening thereof is implemented by holding duct 122 against zone 222 with the aid of a strap or a plastic clamp 126 fastened to two grommets 224 of side pins 212'.

By virtue of this predrilled strip board 200, it is easy to move side pins 212' and to adapt clamp 126 so as to fasten ducts 122 of very variable sizes.

Figure 8:
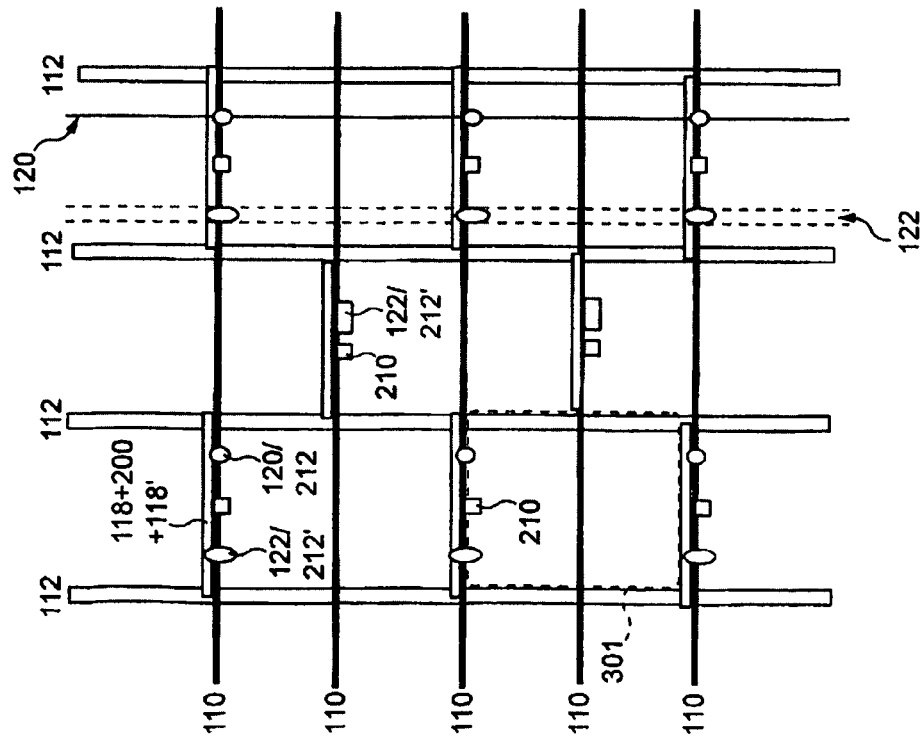
FIG. 8 illustrates the general architecture of the fuselage structure of the example of FIG. 4.

On FIG. 8, the architecture resulting from implementation of the invention has been shown, in a manner similar to FIG. 2.

The assemblies made up of facing stabilizers 118,118' and a strip board 200 are disposed staggered in the fuselage. Each assembly thus supports the various fastenings for ducts 122, wires 120, insulation mattresses and other equipment items.

By positioning pins 212, 212' and 212" at the same holes 206 in the various strip boards 200 along a frame 112, a regular and appropriate deployment of the wires and pipes is easily achieved.

Figure 9:
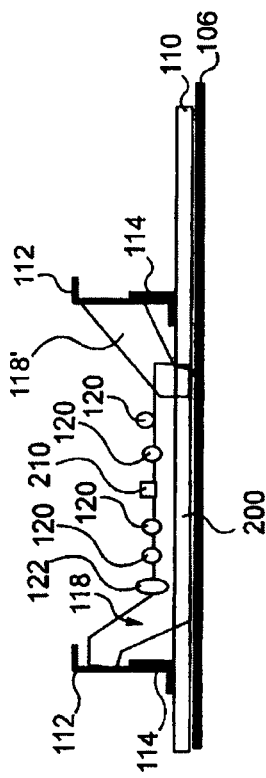
FIG. 9 illustrates a second example of the invention.

A second embodiment of the invention has been shown on FIG. 9. Therein, strip board 200, such as described above, is integrated into one of stabilizers 118, 118' in the same piece, and is fastened at its free end to the other stabilizer, as described above.

The use of a strip board 200 integrated into one of the stabilizers leaves great freedom in the routing of the upper part of strip board 200 in order to directly form supports for equipment items on this strip board, for example for an air pipe.

As shown on this Figure, strip board 200 is fastened all along base-plate 110a of the stringer, thus providing an increased rigidity of fuselage structure 100.

In this case, for the insulation mattress there are provided holes 210 that are in the lower part of the strip board in relation to holes 206 for fastening of equipment items. As will be seen subsequently, that makes it possible to fasten the insulation mattresses closer to skin 116 than equipment items 120, 122 and thus not to take the latter into account in the design of these mattresses.

As a variant, the strip board may be raised in relation to the stringer, as proposed above in connection with FIG. 4, by the use of one or more lugs 202.

Still as a variant, strip board 200 may be made up of two halves of strip boards, each being integrated into one of stabilizers 118, 118'. The fastening of the two halves is accomplished at their respective free ends by appropriate means such as rivets. A lug for fastening to base-plate 110a integrating a hole 210 for fastening of a mattress is provided on each of the half strip boards. This configuration makes it possible in particular to use a single type of stabilizer 118 equipped with a strip-board half, to form a strip board and therefore the fuselage as a whole.

Figure 10:
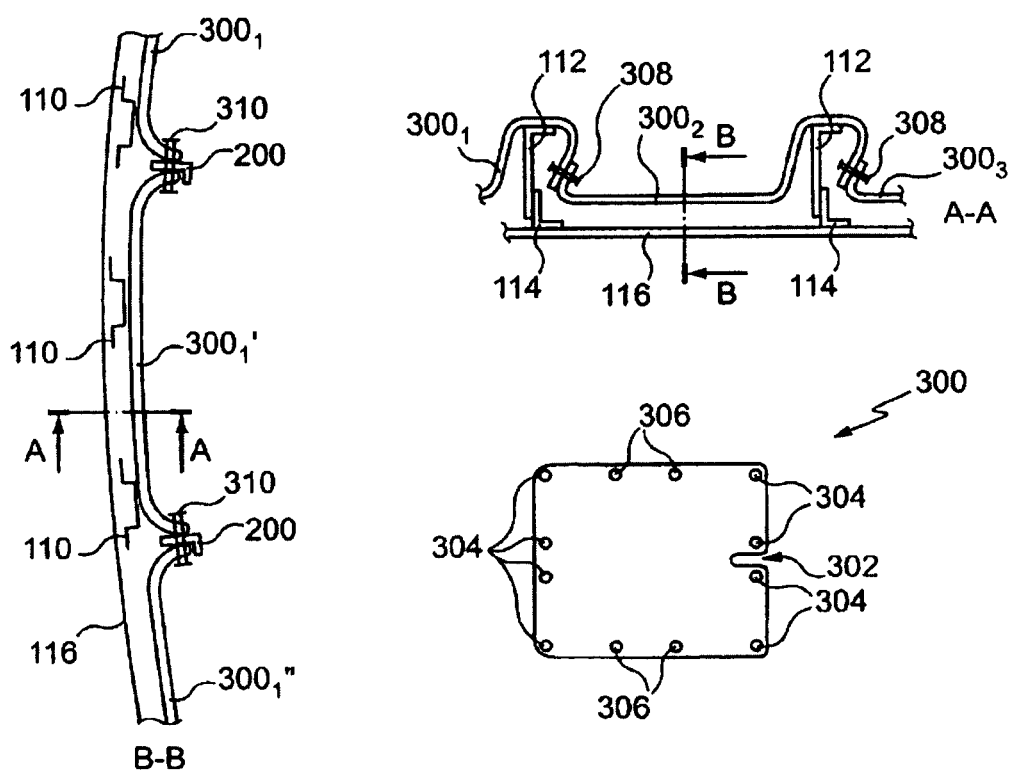
FIGS. 10 and 11 illustrate a first exemplary fastening of a flexible-type insulation mattress on a strip board according to the invention.

An exemplary fastening of a flexible-type insulation mattress 300 made, for example, by superposition of several layers such as rock wool, water-repellent fabric, is illustrated by FIG. 10. A mattress 300 is provided to come to more or less cover a zone defined between two consecutive strip boards 200 and two frames 112 (see coverage zone 301 on FIG. 8).

Insulation mattress 300 is more or less of rectangular shape with a cut-out 302 in the middle of one of the sides. As will be seen subsequently, this cut-out 302 is provided to follow the contours of a stabilizer 318.

Mattress 300 also has holes 304 provided on two opposite sides including the one with cut-out 302, for fastening the mattress to corresponding holes of other mattresses, and holes 306 provided on the other two sides for fastening same to strip boards 200 defining its coverage zone 301.

Figure 11A:
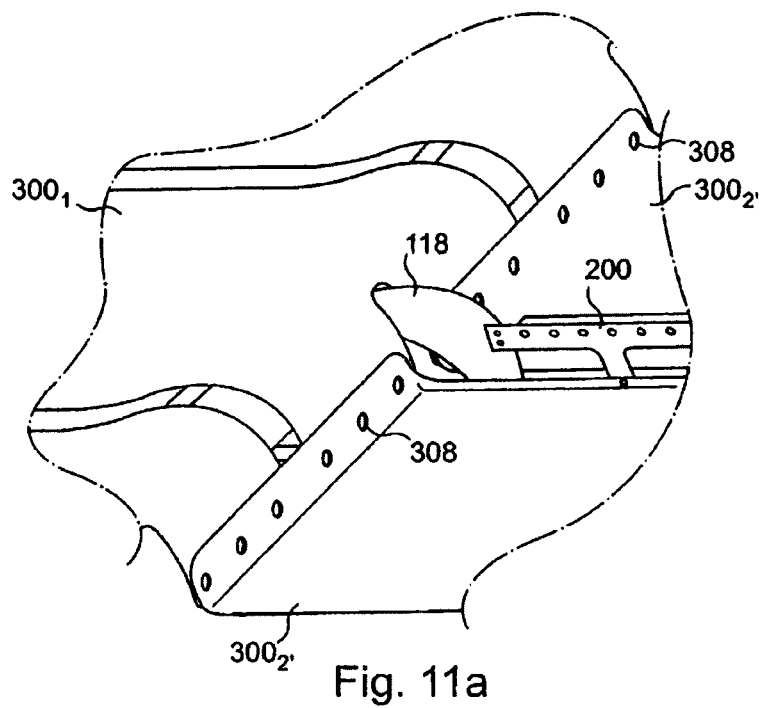
Figure 11B:
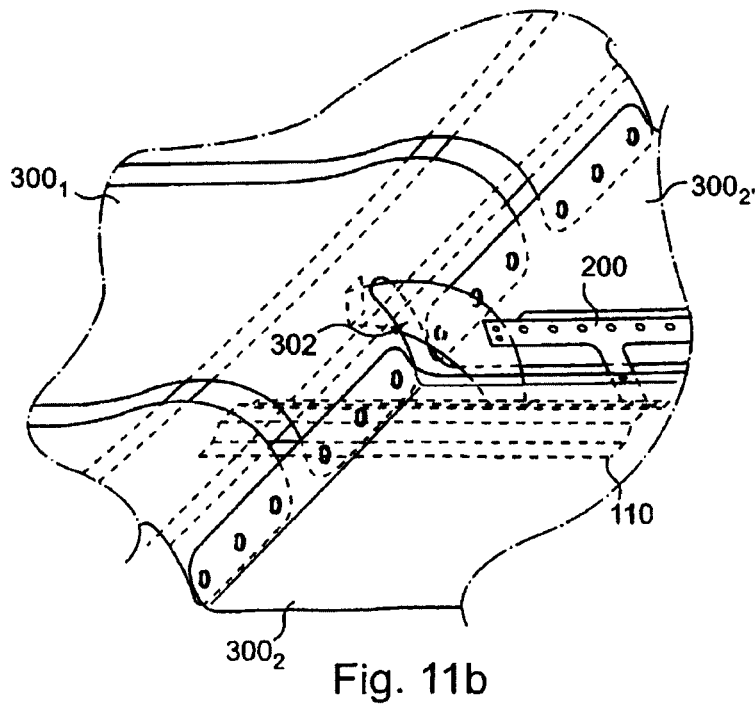

As illustrated on section A-A parallel to a stringer 110, mattress $300_2$ is disposed, for the most part, parallel to skin 116. It is fastened, at holes 304 and with the aid of suitable plastic pins 308, to holes 304 of mattresses $300_1$, $300_3$ of the adjoining zones. On this Figure, it is seen that mattress $300_2$ comes to envelop frame 112. Cut-out 302 thus is provided to come to follow stabilizer 118 which is situated at mid-width (because of the staggered architecture) so as to go down to the adjoining mattress. FIG. 11 clearly shows this zone.

As is understood from FIG. 8 showing the staggered architecture and from FIG. 11, mattress $300_1$ of a zone 301 is fastened on one side to two adjoining mattresses $300_2$, $300_2'$ by half, and on the other side to two other adjoining mattresses by half.

With reference now to section B-B parallel to a frame 112, mattress $300_1$ is fastened, at its holes 306, to boring(s) 210 of strip board 200, in particular with the aid of plastic pins 310. On the Figure, the same hole 210 is used to fasten, with the aid of a sole plastic pin, the two adjacent mattresses $300_1$, $300_1'$ to the same strip board 200.

Figure 12:
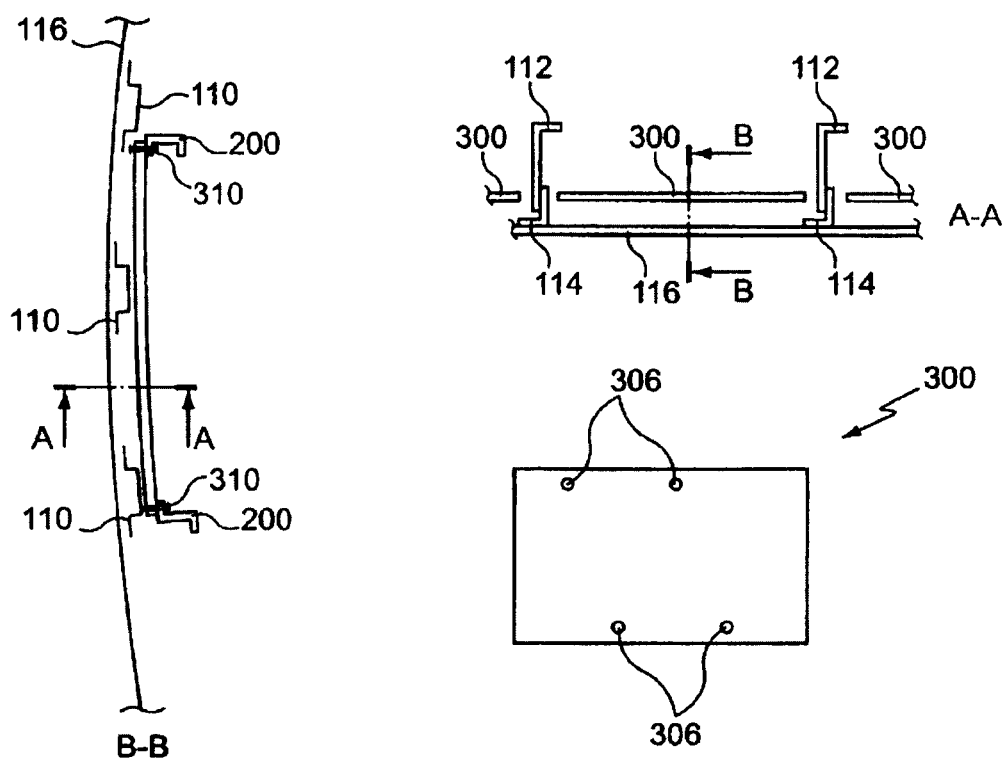
FIGS. 12 and 13 illustrate a secondary exemplary fastening of a rigid-type insulation mattress on a strip board according to the invention.

A second exemplary fastening of an insulation mattress 300, this time of rigid type, has been shown on FIG. 12. Consequently it is a matter of rigid rectangular plates with the dimensions of zone 301.

In this example, plates 300 have only holes 306 for fastening to strip boards 200 on two opposite sides.

Figure 13:
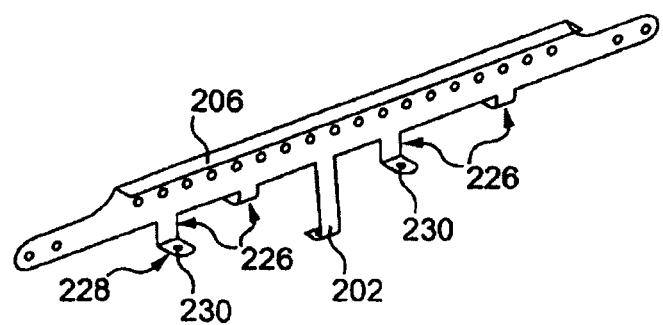

A strip board 200 adapted for this example is shown on FIG. 13. Strip board 200 comprises, in a part below borings 206, "L"-shaped lugs 226 extending the main portion of the said strip board downward. In the example of the Figure, two lugs alternately positioned on the two sides of strip board 200 are provided so as to furnish fastening means for the mattresses on the two sides.

Extension 228 of the "L" of lugs 226 is equipped with a boring 230 provided to cooperate, by means of plastic pins 310, with holes 306 of the mattress.

Depending on whether the strip boards are situated at the top or at the bottom of the fuselage, the mattresses may be disposed on one or the other side of extension 228 of the lug so that the latter (228) has a function of support for the mattress with gravity. In this way the stresses to which fastening pins 310 are subjected are reduced.

On section A-A, it is observed that mattresses 300 are not connected to frames 112. On section B-B, it is seen that mattresses 300 are fastened only to strip board 200 by pins 310.

In this configuration, adjoining mattresses are not connected to each other, unlike the first example above.

Figure 14:
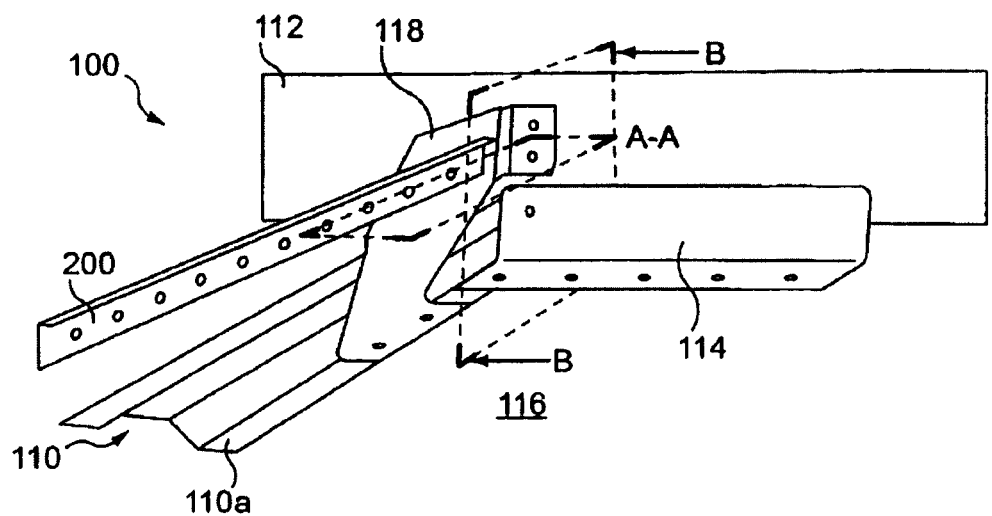
FIGS. 14 and 15 illustrate the metallization of parts of the fuselage structure of the invention.
Figure 14:
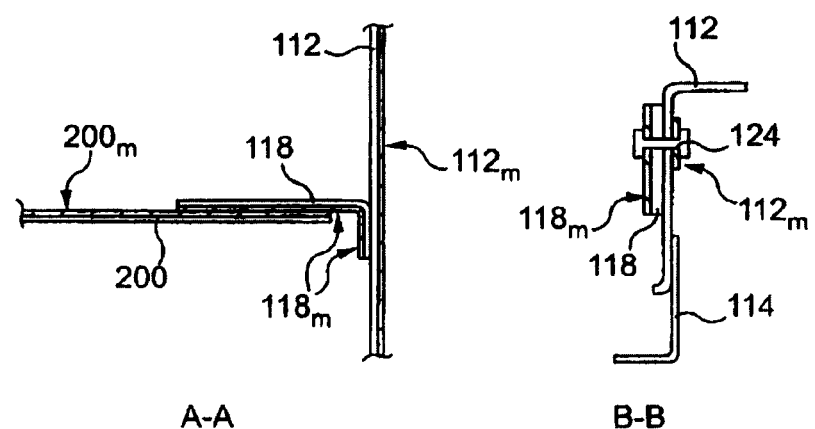
Figure 15:
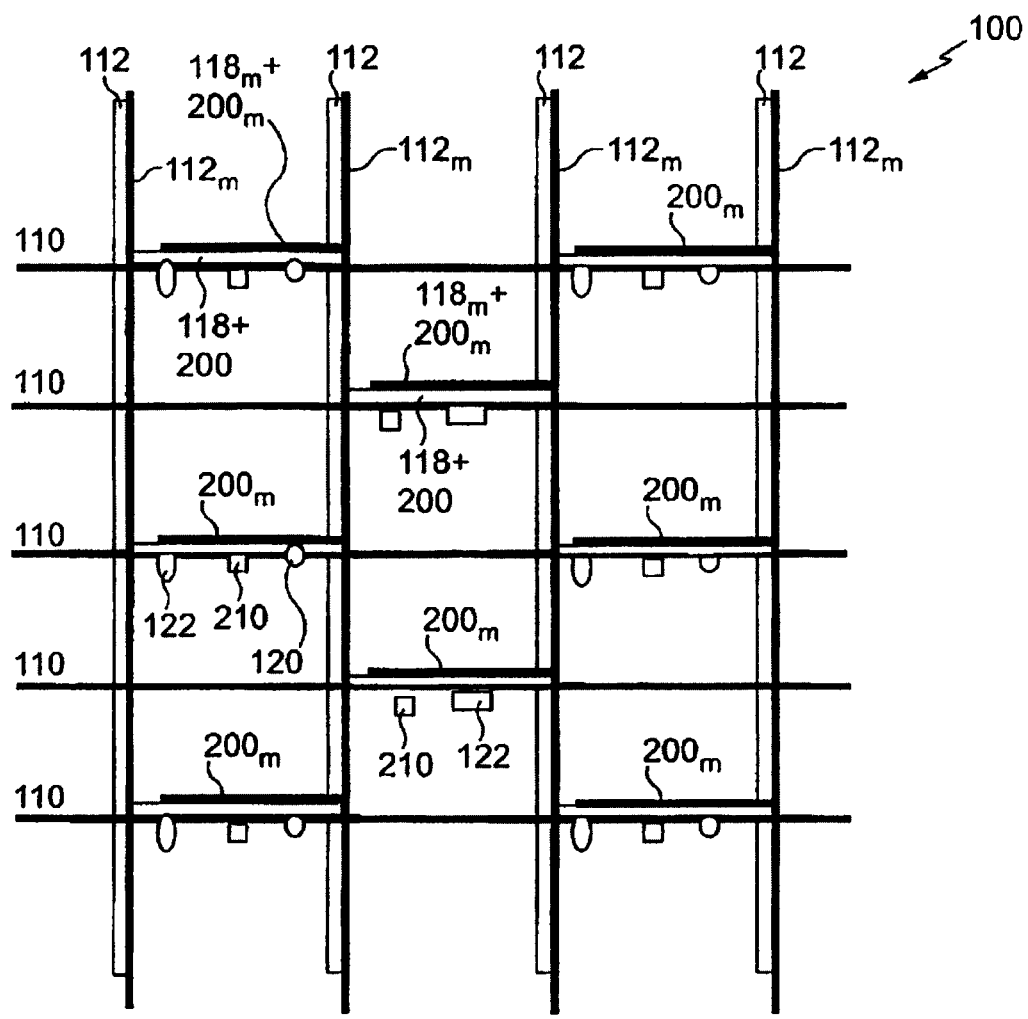

There is illustrated, with reference to FIGS. 14 and 15, the metallization of the surfaces of elements making up structure 100 so as to provide the airplane with a metal meshing conducive to imparting an electromagnetic protection for the electric systems that it carries on board, such as electronic cards.

Structure 100 of the fuselage has been shown with strip board 200 devoid of fastening pins, insulation mattresses and equipment items fastened thereto.

Frame 112, stabilizer 118 and strip board 200 each have a main, more or less flat composite portion, a section of which is shown on section A-A.

Each of these three elements of structure 100 has, on only one face of this main portion, a metal coating $112_m$, $118_m$ and $200_m$ for example of copper, aluminum or bronze or any electrically conductive alloy. The opposite face thus is devoid of electrically conductive surface. This metal coating may consist of a fold of the composite structure of these elements integrated during the manufacturing process. As a variant, the coating may be deposited later by mere bonding of a metal strip.

On section A-A, stabilizer 118 and strip board 200 are fastened to one another by their metal faces $118_m$ and $200_m$. A riveting of these two elements makes it possible to maintain a permanent physical contact between these two metal faces.

As for stabilizer 118 and frame 112, they are fastened to one another by their nonmetal faces.

On section B-B showing the fastening between stabilizer 118 and frame 112, there are used one or more traversing metal rivets 124 made of copper, aluminum or bronze or any other electrically conductive alloy which keeps the two nonmetal faces of the two structural elements close together. The two heads of rivet or rivets 124 are in direct contact with the metal coating of stabilizer 118 and frame 112 respectively. In this way, rivet(s) 124 ensures/ensure the continuity of electric conduction between stabilizer 118 and framework 112.

The electromagnetic current picked up by these electric coatings thus is sent back to the mass of the aircraft.

On FIG. 15, there is seen the electrically conductive metal meshing obtained in this way a part of structure 100.

Coating $112_m$ of frames 112 provides the vertical meshing, corresponding more or less to the periphery of a cabin/fuselage section, while coatings $118_m$ and $200_m$ combined provide horizontal meshing portions between two consecutive frames 112.

The "electrically conductive" contact between the two vertical and horizontal meshings in particular is provided by rivet(s) 124 as shown on section B-B of FIG. 14.

The above examples are merely embodiments of the invention, which is not limited thereto.

In particular, the fastenings of the structural fuselage elements above generally are illustrated by means of riveting. Other well known techniques, such as bonding, may be applied in the context of this invention.

Furthermore, irrespective of the embodiment, strip board 200 may be routed at its upper part to form directly, in the thickness thereof, a support for the wires or pipes or other equipment. These "support" routings may be combined with the systems for attachment by pins, more adjustable.

The invention claimed is:

1. A structure for combined fastening of insulation mattresses and equipment items on a fuselage of an aircraft, the structure comprising:

stringers, including a first stringer;

a first stabilizer on a first frame that connects the first frame to the first stringer; and a second stabilizer on a second frame that connects the second frame to the first stringer, wherein the first stabilizer faces the second stabilizer on the first stringer between the first frame and the second frame, and wherein a strip board connects the first and second stabilizers and includes fastening means arranged to accommodate corresponding means for fastening the insulation mattresses and equipment items.

2. A fastening structure according to claim 1, wherein the fastening means of the strip board comprises a plurality of preformed borings arranged to accommodate the corresponding fastening means and disposed in a part of the strip board between the first and second stabilizers.

3. A fastening structure according to claim 1, comprising a plurality of strip boards connecting a respective plurality of pairs of first and second stabilizers facing each other and disposed staggered in the fuselage.

4. A fastening structure according to claim 1, wherein the strip board, the stabilizers, and the frame comprise a metalized face and a nonmetalized face, the strip board and a stabilizer being fastened by their metalized faces, each stabilizer and the corresponding frame being fastened at their nonmetalized faces by traversing fastening means ensuring an electric conduction between their opposite metalized faces.

5. An aircraft comprising a fastening structure according to claim 1.

6. A fastening structure according to claim 1, wherein frames and stringers are perpendicular to each other.

7. A fastening structure according to claim 1, wherein each stabilizer comprises a first end connected to a stringer, a second end connected to a frame, and a portion between the first end and the second end which connects to the strip board.

8. A fastening structure according to claim 1, wherein at least a part of the strip board constitutes a part of one of the first and second stabilizers.

9. A fastening structure according to claim 8, wherein the first and second stabilizers each comprise a portion extending in a form of a part of the strip board and are fastened to one another by respective free ends of the two parts of the strip board.

10. A fastening structure according to claim 1, wherein the strip board comprises a flat core and an upper edge perpendicular to a main core so as to form a support surface for the equipment items to be fastened.

11. A fastening structure according to claim 10, wherein the fastening means of the strip board comprises a plurality of borings provided in the core and at least one fastening element, the fastening element having a bottom part including a pin configured to engage in one of the borings, an intermediate part locally in a shape of an inverted U shape and of a size more or less equal to the upper edge so as to come to bear on top, and an upper part comprising a holding or support means for the equipment items.

12. A fastening structure according to claim 10, wherein the strip board comprises L shaped lugs extending underneath the core and alternately positioned on both sides of the core, each lug comprising, in an extension of the L shape, at least one fastening means configured to accommodate an insulation mattress.

* * * * *